Figure 1:
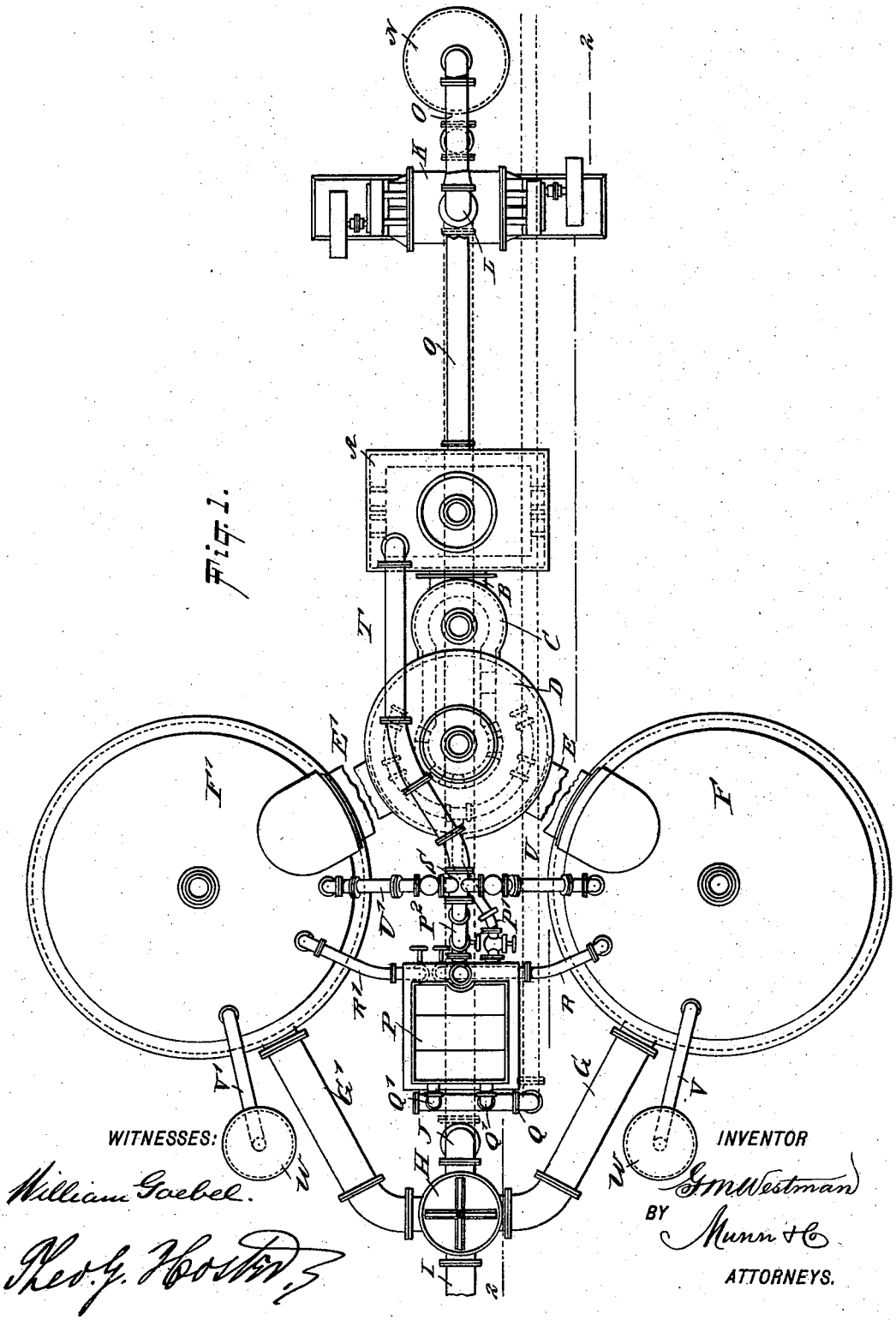

(No Model.) 2 Sheets—Sheet 1.

G. M. WESTMAN.
CONTINUOUS PROCESS OF REDUCING IRON SPONGE.

No. 590,925. Patented Sept. 28, 1897.

WITNESSES:
William Goebel.
Theo. G. Hoster.

INVENTOR
G. M. Westman
BY Munn & Co.
ATTORNEYS.

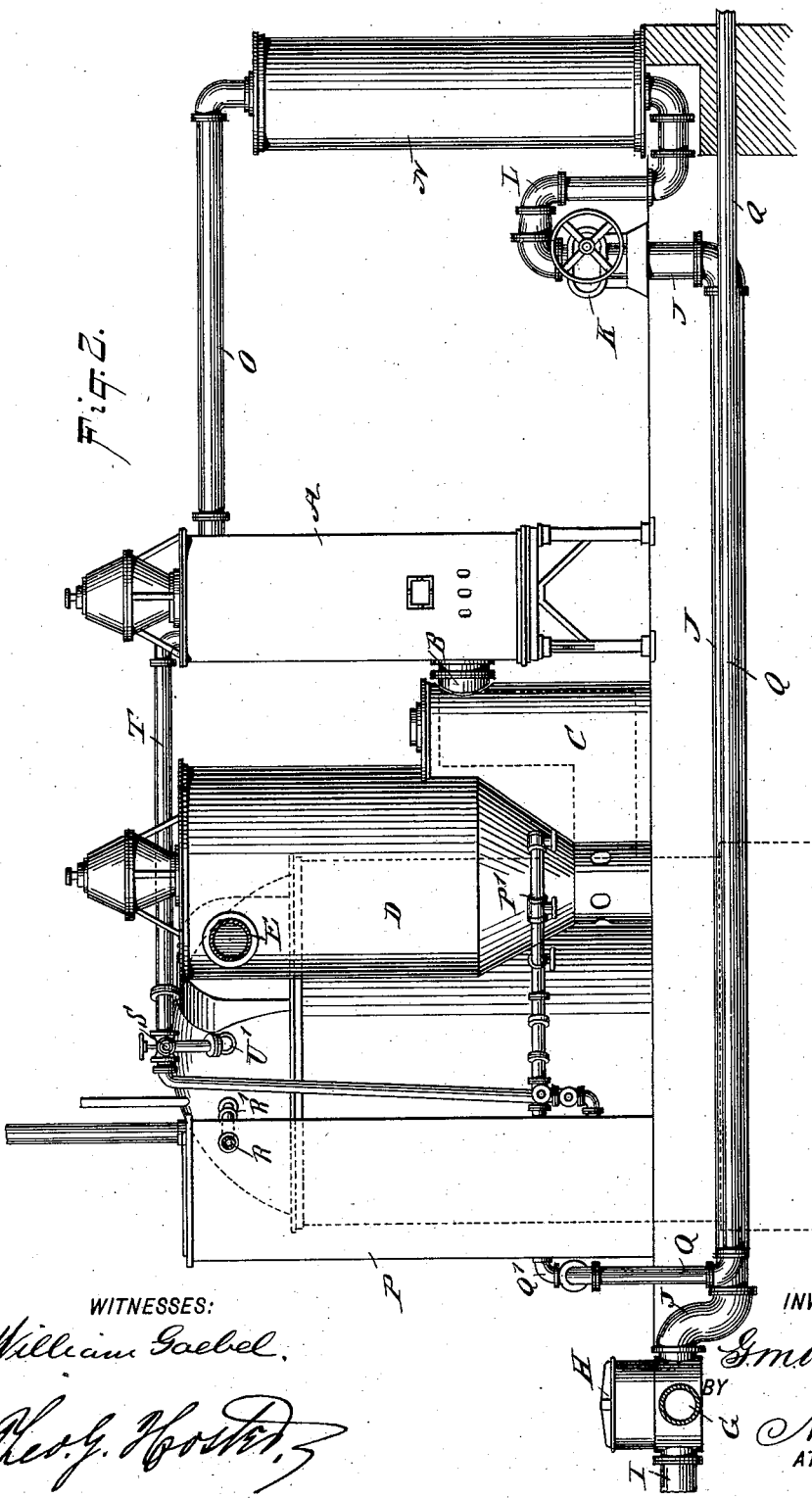

UNITED STATES PATENT OFFICE.

GUSTAF M. WESTMAN, OF HACKETTSTOWN, NEW JERSEY.

CONTINUOUS PROCESS OF REDUCING IRON SPONGE.

SPECIFICATION forming part of Letters Patent No. 590,925, dated September 28, 1897.

Application filed November 30, 1894. Renewed March 9, 1897. Serial No. 626,693. (No specimens.)

*To all whom it may concern:*

Be it known that I, GUSTAF M. WESTMAN, a subject of the King of Sweden and Norway, residing at Hackettstown, in the county of Warren and State of New Jersey, have invented a new and Improved Continuous Process of Reducing Iron Sponge, of which the following is a full, clear, and exact description.

The object of the invention is to provide a new and improved continuous process of reducing iron ores directly with gases and in a very simple and economical manner and without injury to the quality of the product.

The invention consists in a process of reducing iron ore by means of a mixture of gases consisting partly of newly-formed gases and partly of a gas previously passed through the ore and afterward heated and carbureted.

In order to carry this process into effect, I employ a furnace, preferably of the construction shown in the accompanying drawings, forming part of this specification, and in which similar letters of reference indicate corresponding parts in both figures.

Figure 1 is a plan view of the improvement, and Fig. 2 is a sectional side elevation of the same on the line 2 2 of Fig. 1.

Furnaces as heretofore constructed for reducing ores—such, for instance, as the furnace shown and described in Letters Patent No. 383,201, granted to me on May 22, 1888, in which the gases were drawn off from the charge and passed over glowing coke and superheated and again passed through the ore to be reduced—were not sufficient to practically reduce the charge in the furnace owing to the lack of gases and heat in the furnace.

In my present process I introduce into the reducing-furnace a mixture of gases consisting partly of newly-formed gases and partly of gas that has previously passed through the ore and been heated and carbureted, so that a sufficient quantity of gases at the necessary temperature is introduced into the reducing-furnace to properly reduce the charge thereon.

As illustrated in the drawings, the reducing-furnace A of any approved construction is provided at or near its bottom with a flue B, leading to a chamber C, connected with the coke-well D of any approved construction. The latter is connected at or near its upper end on opposite sides with the flues E and E', leading to the upper ends of the regenerators F and F', respectively, of any approved construction, and connected at or near their bottoms by the pipes G and G', respectively, with a valve H, adapted to be connected by a pipe I with a chimney or other draft-flue. The valve H is also connected by a pipe J with a blower K of any approved construction, and connected by a pipe L with the bottom of the cooler N, also of any approved construction, and connected at its upper end by a pipe O with the top of the reducing-furnace A, so as to draw the gases from the latter, as hereinafter more fully described.

Between the regenerators F and F' is arranged a hot-blast chamber P, into the lower end of which discharge the branch pipes Q', extending from a pipe Q, connected with a blower. (Not shown.) The chamber P is also connected near its upper end by pipes R and R' with the domes of the regenerators F and F', respectively.

From the lower end of the chamber P leads a pipe P', connected with the lower end of the coke-well D, so as to supply the latter with the necessary hot air, as hereinafter more fully described.

From the chamber P, and from near the lower end of the same, leads another pipe $P^2$, extending upwardly and connected with a box or casing S, from which leads a pipe T to the top of the reducing-furnace A, as plainly shown in the drawings. From the sides of the casing S lead the valved pipes U and U' into the domes of the regenerators F and F'. The latter are also connected with pipes V and V', respectively, serving to carry oil from tanks W to the domes of the regenerators F and F' for the purpose hereinafter more fully explained.

The operation is as follows: The reducing-furnace A is filled and continuously fed with iron ores through the hopper and the ores withdrawn from the bottom after having been exposed to the heated gases and reduced. From a blower (not shown on the drawings) air is forced through the pipe Q into the hot-blast chamber P and from there through different twyers into the coke-shaft D, filled with coke, thus forming carbonic-oxid gases. At the same time the gases, after having gone through the ores in the reducing-furnace, are passed from there to the blower L and from there forced, through the pipe O, the valve H, and pipes G G', into the regenerator F or F'. By going through one of the regenerators the gases are strongly heated and, through one of the flues E or E', are forced into the coke-shaft, where they are carbureted. These carbureted gases force the newly-formed gases in the coke-shaft to follow them into the reducing-furnace, wherefrom they go to the blower, thus completing the circuit. The other part, or the surplus gases, passes from the reducing-furnace, through the pipe T and the branch pipes V or V', into the regenerators F or F', respectively, and a smaller part is also conducted through the pipe $P^2$ into the hot-blast chamber to heat the same.

When one of the regenerators is heating the circulating gases, the other is heated by burning the surplus gases with hot air from the hot blast passing through the pipes R or R' into the regenerators F or F', respectively. The products of combustion are discharged through the pipes G or G', respectively, into the valve H and into the pipe I, leading to the chimney.

Instead of reducing the carbonic-acid-containing gases with coke it may be advantageous to do it by passing oil into the top of the regenerators when the circulating gases pass these regenerators. By this arrangement the reducing-furnace A is supplied with gages which have already passed through the reducing-furnace and have been regenerated or carbureted and also with newly-formed gases produced in the coke-well in the manner above described, so that a sufficient quantity of gases heated to the necessary temperature is supplied to the reducing-furnace A through the flue B to reduce the charge in the said reducing-furnace.

It is understood that all ores are completely reduced by gases in the blast-furnace, but it is necessary that the gases have a sufficiently high temperature, so as to complete the reduction. An increased temperature, however, of the gases very essentially increases the oxidizing influence of carbonic acid on metallic iron, so that the gases must be absolutely free from carbonic acid at the time they enter the reducing-furnace A in order to remove the last trace of oxygen from the ores.

Now in my former patent above referred to the gases which were to be carbureted were introduced into the glowing coke comparatively cold, so that the coke soon became cooled off and lost its power of carbureting the gases, while in the present case the gases are introduced to the glowing coke at a considerably higher temperature, so that the reduction of the carbonic acid will take place without too much loss of heat from the coke.

In this new process the gases are introduced first, after being preheated in regenerators heated with waste gases and the required quantity of preheated air, (up to from 500° to 600°,) by which, before their passage through the glowing coke, they have gained a temperature of about 1,200° centigrade, and thus do not take away from the hearth more heat than is required for the reduction of the carbonic acid. The reduction of the carbonic acid begins at a relatively low temperature when the gases are filled with the carbonic acid, but to take away the last traces of carbonic acid therefrom a considerably higher temperature is necessary. Besides when the coke is burned with preheated air it is evident that the reduction capacity of the coke-well has been increased to a considerable extent, especially as the new-formed gases are also utilized for reduction of the ore.

In order to increase the reducing capacity of the gases it is advisable to introduce oil at the top of the regenerators F and F' through the pipes V and V', respectively, which are connected with suitable tanks in which oil is stored.

At the time the carbon liberates itself from the hydrogen it is most apt to enter into a chemical combination with other substances and certainly requires less heat to combine with one molecule of oxygen in the carbonic acid than when it has to be removed from its combination with other carbon molecules.

With the above-described process the gases become entirely free from carbonic acid and enter the reducing-furnace at a temperature of about 1,000° to 1,100° centigrade, and by means of circulating more or less of the gases which have gone through the ores I am enabled to regulate the inlet temperature of the mixed gases.

It may be added in further definition of my invention that the forcing of gases through the heated ore, as in the blast-furnace, produces a result very different from what is possible by forcing them over the surface of ore, as in the open-hearth furnace, since in the first case a large amount of oxygen is taken from the ore itself and in the other case none.

In the open-hearth process the gases produced contain five to eight per cent. of carbon dioxid, ($CO_2$,) but in the blast-furnace the per cent. is thirty-five of carbonic oxid (CO) to none of $CO_2$, and even then not more than ninety per cent. of the ore is reduced, the remaining ten per cent. being reduced with solid carbon.

It has been difficult to remove the cinders from the coke-wells with limestone or fluor-spar, but by using basic slag from ordinary blast-furnaces this difficulty is overcome.

Having thus described my invention, I claim as new and desire to secure by Letters Patent—

1. The herein-described process for reducing iron ore to form sponge, which consists in taking gases from the top of the reducing-furnace, heating said gases by passing them through a previously-heated regenerator, then passing the reheated gases down through a body of incandescent coke; next, newly forming another independent body of gases, by independently admitting atmospheric air into and through incandescent coke; and mingling the two bodies of gases thus produced in the presence of incandescent coke, and conducting the mixture into the reducing-furnace directly to return the degree of heat necessary to the reduction of the ore, as specified.

2. The herein-described process for reducing iron ore to form sponge, which consists in taking gases from the top of the reducing-furnace, heating said gases by passing them through a previously-heated regenerator, introducing oil into the regenerator, where it is converted into gas and mingles with the gases, then passing the reheated gases down through a body of incandescent coke; next, newly forming another independent body of gases by independently admitting atmospheric air into and through incandescent coke, and mingling the two bodies of gases thus produced in the presence of incandescent coke, and conducting the mixture into the reducing-furnace directly to return the degree of heat necessary to the reduction of the ore, as specified.

GUSTAF M. WESTMAN.

Witnesses:
   THEO. G. HOSTER,
   JNO. M. RITTER.